United States Patent [19]

Komatsu et al.

[11] 4,097,661
[45] Jun. 27, 1978

[54] PROCESS FOR PRODUCING CONJUGATED DIOLEFINIC POLYMERS

[75] Inventors: Koei Komatsu, Yokkaichi; Kenji Itoyama, Ichihara; Jun Hirota, Ichihara; Akio Nishijima, Ichihara, all of Japan

[73] Assignees: Japan Synthetic Rubber Co., Ltd.; Denki Kagaku Kogyo Kabushiki Kaisha, both of Tokyo, Japan

[21] Appl. No.: 788,351

[22] Filed: Apr. 18, 1977

[30] Foreign Application Priority Data

Apr. 19, 1976 Japan .................................. 51-43707

[51] Int. Cl.² ............................ C08F 4/46; C08F 4/56
[52] U.S. Cl. ...................................... 526/175; 526/181
[58] Field of Search .............................. 526/175, 181

[56] References Cited

U.S. PATENT DOCUMENTS

| 3,223,691 | 12/1965 | Greenberg et al. | 526/175 |
| 3,418,297 | 12/1968 | Grinninger et al. | 526/175 |
| 3,726,832 | 4/1973 | Komatsu et al. | 526/175 |
| 3,836,513 | 9/1974 | Pyke | 526/175 |

Primary Examiner—William F. Hamrock
Attorney, Agent, or Firm—Oblon, Fisher, Spivak, McClelland & Maier

[57] ABSTRACT

A process for producing a conjugated diolefinic polymer by polymerizing at least one conjugated diolefin or copolymerizing at least one conjugated diolefin with at least one vinyl aromatic hydrocarbon in a hydrocarbon solvent in the presence of an alfin catalyst and at least one molecular weight regulator selected from the group consisting of (A) unsaturated halohydrocarbons represented by the general formula, $RCX = CYZ$, wherein R represents hydrogen, an alkyl group having 1 to 7 carbon atoms, a vinyl group, a phenyl group, a substituted phenyl group, or a halogen atom and X, Y and Z represent independently a hydrogen or halogen atom, at least one of said R, X, Y and Z being a halogen atom, (B) halogenated aromatic hydrocarbons, (C) ethers, polyethers, and acetals and (D) tertiary amines and, if necessary, a dihydro aromatic hydrocarbon, characterized in that said polymerization or copolymerization is effected in the presence of 0.03 to 0.9 mole of water and/or an alcohol per mole of organosodium contained in said alfin catalyst. According to this invention, there is obtained a polymer or copolymer excellent in green strength and processability of the unvulcanized compound and in physical properties of the vulcanizate.

21 Claims, No Drawings

PROCESS FOR PRODUCING CONJUGATED DIOLEFINIC POLYMERS

This invention relates to a process for producing conjugated diolefinic polymers. More particularly, it relates to a process for producing conjugated diolefinic homopolymers or copolymers excellent in green strength (tensile strength of the unvulcanized rubber) and processability of the unvulcanized compound and also in physical properties of the vulcanizate, which is characterized by adding water and/or an alcohol to the reaction system in polymerizing conjugated diolefins or copolymerizing conjugated diolefins with vinyl aromatic hydrocarbons with an alfin catalyst in the presence of (A) an unsaturated halohydrocarbon, (B) a halogenated aromatic compound, (C) an ether, a polyether or an acetal or (D) a tertiary amine, as the molecular weight regulator.

It has been well known that a polymer obtained by contacting a conjugated diolefin or a mixture of a conjugated diolefin and a vinyl aromatic hydrocarbon with an alfin catalyst (hereinafter such a polymer is referred to as alfin rubber) is a synthetic rubber excellent in abrasion resistance, felxural strength, and tensile strength when vulcanized and particularly excellent in green strength, as not seen in other synthetic rubbers. Difficulties encountered in processing the alfin rubber, owing to its extremely high molecular weight, are being eliminated by the discovery of various molecular weight regulators.

The molecular weight regulators are divided into two broad classes, one being hydrocarbon type and the other being compounds containing halogen, oxygen or nitrogen atoms. Effective molecular weight regulators of the hydrocarbon type are dihydro aromatic hydrocarbons (Japanese Patent Publication No. 15,034/62) and 1,4-dienes (U.S. Pat. No. 3,518,238). Regulators containing halogen, oxygen, or nitrogen atoms include unsaturated halohydrocarbons (U.S. Pat. No. 3,953,409), aromatic halogenated compounds (Belgian Pat. No. 706,516), ethers and acetals (U.S. Pat. No. 2,841,574), polyethers (Japanese Patent Publication No. 36,517/70) and tertiary amines (U.S. Pat. No. 2,841,574).

Of the above molecular weight regulators, those of the hydrocarbon type have an advantage of producing a polymer of a high trans-1,4 content characteristic of the alfin rubber without causing any change in microstructure of the polymer, and the resulting alfin rubber is characterized by a high green strength. The alfin rubber thus obtained, however, shows disadvantages in processing such as, for example, an extremely high rolling temperature. On the other hand, the alfin rubber formed by using regulators containing halogen, oxygen or nitrogen atoms in characterized in that it has excellent processability and can be processed by substantially the same procedures as used in processing customary generalpurpose rubbers. However, the use of said regulator results in a change in microstructure of the alfin rubber obtained, that is to say, the trans-1,4 content is reduced and the vinyl content is increased. Further, the green strength of the polymer obtained is low, whereby the feature as alfin rubber is weakened.

The present inventors have made various studies to overcome the disadvantages exhibited by the latter class of molecular weight regulators and, as a result, have found that when water and/or an alcohol is present in the above reaction system, the excessive decrease in molecular weight (or Mooney viscosity) is prevented to impart an adequate molecular weight to the resulting polymer, and the trans-1,4 content of the polymer is increased, whereby a polymer excellent in all of the green strength, processability, and physical properties of the vulcanizate is obtained.

An object of this invention is to provide a process for producing an alfin rubber which is excellent in green strength, processability and the physical properties of vulcanizate.

Other objects and advantages of this invention will become apparent from the following description.

According to this invention, there is provided a process for producing a conjugated diolefinic polymer by polymerizing at least one conjugated diolefin or copolymerizing at least one conjugated diolefin with at least one vinyl aromatic hydrocarbon in a hydrocarbon solvent in the presence of an alfin catalyst and at least one molecular weight regulator selected from the group consisting of (A) unsaturated halohydrocarbons represented by the general formula, $RCX = CYZ$, wherein R represents hydrogen, an alkyl group having 1 to 7 carbon atoms, a vinyl group, a phenyl groups, a substituted phenyl group, or a halogen atom and X, Y and Z represent independently a hydrogen or halogen atom, at least one of said R, X, Y and Z being a halogen atom, (B) halogenated aromatic hydrocarbons, (C) ethers, polyethers, and acetals, and (D) tertiary amines and, if necessary, a dihydro aromatic hydrocarbon, characterized in that said polymerization or copolymerization is effected in the presence of 0.03 to 0.9 mole of water and/or an alcohol per mole of organosodium in said alfin catalyst.

The molecular weight regulators (A) to (D) used in this invention include the following examples:

(A) Examples of the unsaturated halohydrocarbons represented by the general formula $RCX = CYZ$ are, for instance, vinyl chloride, vinyl bromide, vinyl iodide, vinyl fluoride, vinylidene chloride, vinylidene fluoride, isopropenyl chloride, trichloroethylene, 2-chloro-1-butene, α-chlorostyrene, chloroprene and the like, vinyl chloride and vinylidene chloride being particularly preferred.

(B) Examples of the halogenated aromatic hydrocarbons are, for instance, chlorobenzene, bromobenzene, o-dichlorobenzene, m-dichlorobenzene, p-dichlorobenzene, o-chlorotoluene, α-chloronaphthalene and the like.

(C) Examples of the ethers, polyethers, and acetals are, for instance, diethyl ether, diisopropyl ether, ethyl butyl ether, methyl benzyl ether, ethylene glycol diethyl ether, diethylene glycol dimethyl ether, 1,1-dimethoxyethane, and benzaldehyde dimethyl acetal.

(D) Examples of the tertiary amines are, for instance, diethylmethylamine, triethylamine, trimethylamine, triisopropylamine, dimethylpropylamine, dimethylaniline, and the like.

The amount of the molecular weight regulator to be used may be such as is sufficient to produce a polymer having a desired Mooney viscosity and may be varied depending on the type of regulator. The amount of the regulator used per 100 g of the monomer is usually 0.01 to 1,000 mM (millimoles) in the case of (A), 0.05 to 2,000 mM in the case of (B), 0.01 to 10,000 mM in the case of (C), and 0.02 to 10,000 mM in the case of (D). These regulators may be used alone or in admixture or in admixture with regulators of the hydrocarbon type. As the regulators of the hydrocarbon type, dihydro aromatic hydrocarbons are particularly preferred because the resultant polymer has excellent physical properties. The dihydro aromatic hydrocarbons include, for example, 1,4-dihydrobenzene, 1,2-dihydrobenzene, 1,4-dihydronaphthalene, 1,2-dihydronaphthalene, dihydrotoluene, dihydroxylene, dihydroanthracene, and the like.

Particularly preferable is a combination of an unsaturated halohydrocarbon (A) represented by the general formula RCX = CYZ, and a halogenated aromatic hydrocarbon (B), with a dihydro aromatic hydrocarbon. With the above combination no gel is formed and a polymer having a Mooney viscosity of about 30 to 70 is readily obtained in a yield as high as 90% or more. Moreover, as compared with conventional alfin rubbers, the polymer thus obtained is characterized by lower content of both ultrahigh molecular weight fraction and low molecular weight fraction, better processability, and better and well-balanced physical properties of vulcanizate, such as, for example, modulus of elasticity, tensile strength, and elongation. A further advantage of the above procedure is that the molecular weight regulating effect is constant throughout the initial, intermediate, and final stages of polymerization, so that the alfin rubber can be produced in a continuous manner.

According to this invention, in addition to the above-mentioned advantages, the use of water or an alcohol together with the molecular weight regulators enables a further improvement of the green strength and processability of the polymer as well as the physical properties of the vulcanizate.

The water and/or alcohol is added to the reaction system in such an amount that the effect can be obtained without causing hindrance of the polymerization, and it ranges from 0.03 to 0.9 mole, preferably from 0.05 to 0.6 mole, per mole of organosodium in the catalyst. If the amount is below 0.03 mole, the advantage of this invention cannot be sufficiently obtained, while if it exceeds 0.9 mole, polymerization is hindered.

The alcohol to be added to the reaction system is one represented by the general formula, R—OH, wherein R is a saturated or unsaturated aliphatic or alicyclic hydrocarbon radical having 1 to 20 carbon atoms. Examples of the alcohol are, for instance, methanol, ethanol, isopropanol, n-butanol, n-dodecyl alcohol, cyclohexyl alcohol, cyclooctyl alcohol, and the like. Of these, methanol, ethanol, isopropanol, and n-butanol are preferred, and particularly preferable are isopropanol and n-butanol.

Since water and/or alcohol is added to the reaction system in this invention, it is not necessary to use an anhydrous solvent, and it has an economical and an operational effect. Addition of the alcohol can also easily be carried out, because the alcohol used in this invention is easily soluble in the reaction medium.

Although the way of adding water and/or an alcohol to the reaction system is not critical, it is desirable to add water and/or an alcohol to the solvent prior to contacting the catalyst with a monomer or monomers. Alternatively, a suitable amount of the hydrocarbon solvent containing a large quantity of water and/or an alcohol may be added to the polymerization system, or a solvent containing a suitable amount of water and/or an alcohol may also be used.

A typical alfin catalyst used in this invention is a ternary mixture or a complex comprising allyl sodium, sodium isopropoxide and sodium chloride, formed by reacting in a hydrocarbon solvent with stirring, n-amyl chloride with a sodium dispersion and further reacting the resultant n-amyl sodium successively with isopropyl alcohol and propylene.

As known well (e.g. Leo Reich: "Polymerization by Organometallic Compounds", pp. 402–430, 1966, Interscience Publishers), the allyl sodium may be replaced by benzyl sodium, xylyl sodium, pentenyl sodium, cymyl sodium, mesityl sodium, and the like. It is also possible to replace isopropoxide by 2-butoxide, 3-pentoxide, cyclopentoxide, cyclobutoxide, tert-butoxide, and the like. Further, other alkali metal salts such as potassium salts and lithium salts may be used in place of the sodium salts. Other alkyl halides such as n-butyl chloride may be used in place of n-amyl chloride. The conditions for the preparation of an alfin catalyst and the catalyst compositions may, of course, be freely varied according to the known techniques.

The monomers which can be polymerized according to this invention are conjugated dienes such as 1,3-butadiene, isoprene, piperylene, 2,3-dimethyl-1,3-butadiene, and the like. Two or more of these conjugated dienes may also be copolymerized. It is also possible to copolymerize these conjugated dienes with vinyl aromatic hydrocarbons such as styrene, divinylbenzene, $\alpha$-methylstyrene, $\beta$-methylstyrene, 3-vinyltoluene, 1-vinylnaphthalene, 2-vinylnaphthalene, p-methoxystyrene, p-bromostyrene, and the like.

Polymerization according to this invention may be carried out in a batchwise or continuous manner according to knwon techniques by contacting the monomer or monomers with an alfin catalyst in a hydrocarbon solvent in the presence of a molecular weight regulator and other additives. The polymerization temperature may be varied in a wide range of from about −50° to 150° C, preferably from about −20 °to 80° C. Any reaction pressure sufficient to keep the reactant mixture in the liquid phase may be used. It is generally in the range of 1 to 5 atmospheres. It is desirable to carry out the polymerization under an atmosphere of an inactive gas such as argon, helium, or nitrogen.

The catalyst is used in an amount of about 0.1 to about 100 millimoles in terms of organosodium per 100 g of the monomer. The weight ratio of hydrocarbon solvent to monomer is roughly 1 : 1 to 100 : 1.

As the hydrocarbon solvent, there may be used aliphatic hydrocarbons, alicyclic hydrocarbons, aromatic hydrocarbons, and partially hydrogenated aromatic hydrocarbons. Preferable solvents are n-pentane, isopentane, n-hexane, n-heptane, n-octane, and isooctane among the aliphatic hydrocarbons; cyclohexane and cyclooctane among the alicyclic hydrocarbons; benzene, toluene, and xylene among the aromatic hydrocarbons; and tetrahydronaphlthalene among the partially hydrogenated aromatic hydrocarbons.

When the polymerization has proceeded to a desired stage, the reaction is terminated by adding an excess of water, an alcohol, or other catalyst inactivating agents to the reaction mixture. The solvent is then removed in a customary manner to obtain the objective polymer or copolymer. Before the removal of the solvent, it is desirable to add an antioxidant such as phenyl-$\beta$-naphthylamine to the reaction mixture.

The invention is illustrated below in further detail with reference to Examples, which are merely by way of illustration and not by way of limitation. The alfin catalyst used in the Examples and Comparative Examples was prepared in the following manner:

Into a four-necked flask provided with a stirrer, a reflux condenser, a thermometer and an external cooling bath was charged 300 parts of dry n-hexane. To the flask was added 23 parts (1.0 gram atom) of finely divided sodium (2 $\mu$ in particle size), and the contents of the flask were cooled to $-10°$ C. Thereafter, 53.3 parts (0.5 mole) of dry amyl chloride was added gradually with gentle stirring, while maintaining the reaction system at $-10°$ C. After the completion of the addition, stirring was further continued for about one hour. Then 15 g (0.25 mole) of dry isopropyl alcohol was gradually added with stirring, and the stirring was continued for an additional 45 minutes. After an excess of dry propylene had been introduced into the reaction system, the reaction temperature was maintained at $-10°$ C until the propylene began to reflux. Then, the temperature was gradually elevated until it finally reached 25° C. After the reaction system had been kept at this temperature for about 2 hours while being stirred, the excess propylene was removed from the system. To the resulting reaction mixture was added dry n-hexane to make a total volume of 800 ml. All the above procedures were carried out under a nitrogen atmosphere.

In the Examples and Comparative Examples, the intrinsic viscosity of the polymer was measured in toluene at 30° C by means of a Ubbelohde's viscometer. The microstructure of polybutadienes was determined by the infrared absorption spectrum method proposed by D. Morero [Chim. e Ind., 41, 758 (1959)]. The styrene content is a styrene-butadiene copolymer was determined from the absorbancy at 699 cm$^{-1}$ in infrared absorption spectrum according to the base line method.

The Mooney viscosity of the polymer was measured in accordance with the testing method specified in Japanese Industrial Standard (JIS) K 6300under the following conditions: dies with square grooves; speed of rotor, 2 rpm; type of rotor, L (large size); warm-up time, 1 minute; running time of rotor, 4 minutes; temperature of test, 100° C. Accordingly, the viscosity value was given under the designation of ML $_{1+4}$(100° C).

The water content in the polymerization system was determined by means of Karl Fischer's apparatus for measuring water content.

COMPARATIVE EXAMPLE 1

Into a 5-liter autoclave, after the air therein has been thoroughly replaced by high-purity nitrogen, were introduced 2,250 g of dry cyclohexane, 41 millimoles of 1,4-dihydronaphthalene, and 25 g of styrene through an inlet at the top of the autoclave. The autoclave was closed and the stirring was started. Immediately thereafter, 225 g of liquid butadiene was introduced under pressure into the autoclave through a rubber packing at the bottom. After the temperature had been adjusted to 40° C, 51 ml of an alfin catalyst (containing 0.3 millimole of allyl sodium in 1 ml) was introduced under pressure into the autoclave through the rubber packing at the bottom and the reaction was allowed to proceed for 3 hours with stirring. On analysis, the reaction mixture was found to contain 0.024 mole of water per mole of allyl sodium in the catalyst, although no water had been intentionally added. After the completion of the reaction, the contents of the autoclave were withdrawn from the bottom into another vessel. After the addition of an antioxidant, the solvent was removed by steam distillation to obtain a solid polymer in the form of white bread crumbs.

The above solid polymer was washed with water and dried at 40° C under reduced pressure for 2 days. The yield of the polymer thus obtained was 99 %, and the polymer had the following microstructure: 65% of trans-1,4 configuration; 32% of vinyl configuration; and 3% of cis-1,4 configuration. It contained 10% of combined styrene and had an intrinsic viscosity [$\eta$] of 2.62 dl/g and ML$_{1+4}$(100° C) of 50. These data are shown in Run No. 1 in Table 1.

The same procedure as above was repeated, except that the water content in the reaction system was varied by using, as a part of the solvent, cyclohexane saturated with water to obtain the results shown in Run No. 2 in Table 1.

Table 1

| Run No. | Water* content (mole) | Yield (%) | Microstructure (%) | | | Combined styrene (%) | Intrinsic viscosity [$\eta$] (dl/g) | ML$_{1+4}$(100° C) |
|---|---|---|---|---|---|---|---|---|
| | | | Trans | Vinyl | Cis | | | |
| 1 | 0.024 | 99 | 65 | 32 | 3 | 10 | 2.62 | 50 |
| 2 | 0.221 | 96 | 66 | 31 | 3 | 10 | 2.66 | 53 |

Note: *Water content is the amount of water contained in the reaction mixture, in moles per mole of allyl sodium in the catalyst (the same applies hereinafter).

EXAMPLE 1

The same procedure as in Comparative Example 1 was repeated, except that 7 ml of vinyl chloride was used in place of the 1,4-dihydronaphthalene and the water content in the reaction system was varied by using, as a part of the solvent, cyclohexane saturated with water. The results obtained were as shown in Table 2.

Table 2

| Run No. | Water content (mole) | Yield (%) | Microstructure (%) | | | Combined styrene (%) | [$\eta$] (dl/g) | ML$_{1+4}$(100° C) |
|---|---|---|---|---|---|---|---|---|
| | | | Trans | Vinyl | Cis | | | |
| 3 (control) | 0.025 | 98 | 53 | 44 | 3 | 10 | 2.39 | 44 |
| 4 | 0.132 | 98 | 56 | 40 | 4 | 10 | 2.48 | 46 |
| 5 | 0.200 | 95 | 58 | 39 | 3 | 10 | 2.50 | 46.5 |
| 6 | 0.376 | 93 | 63 | 34 | 3 | 11 | 2.62 | 50 |
| 7 | 0.520 | 86 | 65 | 32 | 3 | 11 | 2.67 | 52 |

It is seen from Table 2 that with an increase in water content, the trans-1,4 content of the resulting polymer is increased.

The polymers shown in Tables 1 and 2 were compounded according to the recipe shown in Table 3 on a 6-inch open roll and the green strength of the resulting compound was measured. After having been press-cured at 145° C for 40 minutes, the physical properties of the resulting vulcanizate were measured. The results obtained were as shown in Table 4.

Table 3

| Ingredient | Parts by weight |
|---|---|
| Polymer | 100 |
| HAF carbon black | 50 |
| Aromatic process oil | 5 |
| Zinc oxide | 5 |
| Stearic acid | 3 |
| Accelerator (CZ)* | 1.5 |
| Sulfur | 2 |

Note:- *CZ: n-cyclohexyl-benzothiazyl-sulfenamide

Table 4

| | Run No. | 1 | 2 | 3 | 4 | 5 | 6 | 7 |
|---|---|---|---|---|---|---|---|---|
| Unvulcanized rubber | Mooney viscosity, $ML_{1+4}(100°\ C)$ | 50 | 53 | 44 | 46 | 46.5 | 50 | 52 |
| | Softening temperature*, ° C | 82 | 90 | 53 | 55 | 54 | 58 | 59 |
| | Compounded rubber: | | | | | | | |
| | Green strength, kg/cm² | 29 | 32 | 7 | 15 | 18 | 21 | 23 |
| | 300 % Modulus, kg/cm² | 65 | 66 | 60 | 62 | 62 | 66 | 68 |
| Vulcanizate | Tensile strength, kg/cm² | 224 | 230 | 200 | 205 | 210 | 221 | 239 |
| | Elongation, % | 560 | 550 | 620 | 600 | 580 | 540 | 510 |
| | Hardness (JIS A) | 53 | 54 | 55 | 56 | 56 | 58 | 59 |
| | Remarks | | Control | | | Present invention | | |

Note:- *"Softening temperature" is the temperature of rubber at which 100 g of unvulcanized rubber is uniformly banded on the roll (roll clearance: 1.0 mm; guide distance: 100 mm) and cutting with a knife becomes possible.

It is seen from Table 4 that with an increase of the water content in the polymerization system in which vinyl chloride is used as a molecular weight regulator, the green strength of the polymer and the physical properties of the vulcanizate are increased, while the good processability is retained. Therefore, the rubber according to this invention is found excellent in processability, green strength, and even the physical properties of vulcanizate.

EXAMPLE 2

The same procedure as in Example 1 was repeated, except that 20 millimoles of diethylene glycol diethyl ether was substituted for the vinyl chloride. The results obtained were as shown in Table 5.

Table 5

| Run No. | Water content (mole) | Yield (%) | Microstructure (%) | | | Combined styrene (%) | $[\eta]$ (dl/g) | $ML_{1+4}(100°\ C)$ |
|---|---|---|---|---|---|---|---|---|
| | | | Trans | Vinyl | Cis | | | |
| 8 (control) | 0.021 | 99 | 40 | 57 | 3 | 10 | 2.00 | 32 |
| 9 | 0.114 | 99 | 51 | 45 | 4 | 10 | 2.11 | 36 |
| 10 | 0.210 | 96 | 54 | 42 | 4 | 10 | 2.17 | 37.5 |
| 11 | 0.510 | 90 | 61 | 36 | 3 | 11 | 2.30 | 42 |

Physical properties showed similar tendencies to those in Example 1.

EXAMPLE 3

The same procedure as in Example 1 was repeated, except that 4 millimoles of vinyl chloride, 7 millimoles of o-dichlorobenzene, and 8 millimoles of 1,4-dihydronaphthalene were substituted for the 7 millimoles of vinyl chloride. The results obtained were as shown in Table 6.

Table 6

| Run No. | Water content (mole) | Yield (%) | Microstructure (%) | | | Combined styrene (%) | $[\eta]$ (dl/g) | $ML_{1+4}(100°\ C)$ |
|---|---|---|---|---|---|---|---|---|
| | | | Trans | Vinyl | Cis | | | |
| 12 (control) | 0.024 | 99 | 51 | 46 | 3 | 10 | 2.22 | 40 |
| 13 | 0.150 | 93 | 54 | 43 | 3 | 10 | 2.29 | 43 |
| 14 | 0.207 | 95 | 57 | 40 | 3 | 10 | 2.38 | 45 |
| 15 | 0.396 | 89 | 62 | 34 | 4 | 11 | 2.41 | 45 |

The polymers shown in Table 6 were compounded according to the recipe given in Table 3 and cured in the same manner as in Example 1. The green strength and the physical properties of vulcanizate were measured to obtain the results as shown in Table 7.

Table 7

| | Run No. | 12 | 13 | 14 | 15 |
|---|---|---|---|---|---|
| Unvulcanized rubber | Mooney viscosity, $ML_{1+4}(100°\ C)$ | 40 | 43 | 45 | 45 |
| | Softening temperature, ° C | 55 | 55 | 57 | 56 |
| | Compounded rubber: | | | | |
| | Green strength, kg/cm² | 16 | 28 | 32 | 36 |
| | 300 % Modulus, kg/cm² | 85 | 95 | 95 | 97 |
| Vulcanizate | Tensile strength, kg/cm² | 211 | 220 | 240 | 243 |
| | Elongation, % | 530 | 550 | 570 | 570 |
| | Hardness (JIS A) | 58 | 60 | 59 | 60 |
| | Remarks | Control | Present invention | | |

It is seen from Table 7 that as in Example 1, with an increase of the water content in the polymerization system, the green strength of the polymer and the physical properties of the vulcanizate are increased, while the good processability is retained.

EXAMPLE 4

The same procedure as in Example 3 was repeated, except that 250 g of butadiene was used as the monomer in place of the 25 g of styrene and 225 g of butadiene. The results obtained were as shown in Table 8.

Table 8

| Run No. | Water content (mole) | Yield (%) | Microstructure (%) | | | $[\eta]$ (dl/g) | $ML_{1+4}$ (100° C) |
|---|---|---|---|---|---|---|---|
| | | | Trans | Vinyl | Cis | | |
| 16 (control) | 0.021 | 99 | 53 | 44 | 3 | 2.28 | 43 |
| 17 | 0.158 | 96 | 57 | 39 | 4 | 2.34 | 46 |
| 18 | 0.242 | 93 | 59 | 38 | 3 | 2.39 | 47 |
| 19 | 0.461 | 85 | 63 | 34 | 3 | 2.46 | 49 |

Physical properties showed similar tendencies to those in Example 3.

EXAMPLE 5

The same procedure as in Example 1 was repeated, except that 10 millimoles of 1,4-dihydronaphalene and 15 millimoles of trimethylamine were substituted for the 7 millimoles of vinyl chloride. The results obtained were as shown in Table 9.

Table 9

| Run No. | Water content (mole) | Yield (%) | Microstructure (%) | | | Combined styrene (%) | $[\eta]$ (dl/g) | $ML_{1+4}$ (100° C) |
|---|---|---|---|---|---|---|---|---|
| | | | Trans | Vinyl | Cis | | | |
| 20 (control) | 0.027 | 92 | 49 | 47 | 4 | 10 | 2.36 | 45.5 |
| 21 | 0.138 | 91 | 53 | 44 | 3 | 11 | 2.41 | 45 |
| 22 | 0.287 | 87 | 55 | 43 | 2 | 11 | 2.44 | 47 |
| 23 | 0.509 | 82 | 59 | 38 | 3 | 12 | 2.50 | 47.5 |

Physical properties showed similar tendencies to those in Example 1.

EXAMPLE 6

The same procedure as in Example 1 was repeated, except that 5 millimoles of vinyl chloride and 9 millimoles of o-dichlorobenzene were substituted for the 7 millimoles of vinyl chloride, to obtain the resutls shown in Table 10.

Table 10

| Run No. | Water content (mole) | Yield (%) | Microstructure (%) | | | Combined styrene (%) | $[\eta]$ (dl/g) | $ML_{1+4}$ (100° C) |
|---|---|---|---|---|---|---|---|---|
| | | | Trans | Vinyl | Cis | | | |
| 24 (Control) | 0.020 | 97 | 50 | 46 | 4 | 10 | 2.40 | 45 |
| 25 | 0.146 | 98 | 54 | 43 | 3 | 10 | 2.51 | 47 |
| 26 | 0.292 | 93 | 58 | 39 | 3 | 11 | 2.58 | 49 |
| 27 | 0.513 | 87 | 62 | 35 | 3 | 11 | 2.60 | 49.5 |

Physical properties showed similar tendencies to those in Example 1.

EXAMPLE 7

The same procedure as in Example 1, except that 4 millimoles of vinyl chloride and 8 millimoles of diethylene glycol diethyl ether were substituted for the 7 millimoles of vinyl chloride, to obtain the results shown in Table 11.

Table 11

| Run No. | Water content (mole) | Yield (%) | Microstructure (%) | | | Combined styrene (%) | $[\eta]$ (dl/g) | $ML_{1+4}$ (100° C) |
|---|---|---|---|---|---|---|---|---|
| | | | Trans | Vinyl | Cis | | | |
| 28 (control) | 0.018 | 99 | 48 | 49 | 3 | 10 | 2.16 | 37 |
| 29 | 0.120 | 97 | 54 | 43 | 3 | 10 | 2.23 | 40 |
| 30 | 0.283 | 94 | 58 | 38 | 4 | 10 | 2.28 | 42 |
| 31 | 0.476 | 89 | 63 | 34 | 3 | 11 | 2.30 | 43 |

Physical properties showed similar tendencies to those in Example 1.

EXAMPLE 8

Polymerization was carried out in the same manner as in Comparative Example 1, except that 7 ml of vinyl chloride was substituted for the 1,4-dihydronaphthalene and various alcohols were added in varying amounts to the polymerization system. The results obtained were as shown in Table 12.

Table 12

| Run No. | Alcohol | | Water content (mole) | Yield (%) | Microstructure (%) | | | $[\eta]$ dl/g | $ML_{1+4}$ (100° C) |
|---|---|---|---|---|---|---|---|---|---|
| | Name | Amount* (mole) | | | Trans | Vinyl | Cis | | |
| 3 (control) | — | — | 0.025 | 98 | 53 | 44 | 3 | 2.39 | 44 |
| 32 | Methyl alcohol | 0.033 | 0.021 | 96 | 57 | 40 | 3 | 2.46 | 46 |
| 33 | Methyl alcohol | 0.065 | 0.024 | 93 | 58 | 39 | 3 | 2.47 | 46 |
| 34 | Methyl alcohol | 0.196 | 0.019 | 87 | 61 | 35 | 4 | 2.50 | 46.5 |
| 35 | Methyl alcohol | 0.495 | 0.023 | 76 | 65 | 31 | 4 | 2.53 | 48 |
| 36 | Isopropyl alcohol | 0.033 | 0.021 | 97 | 56 | 41 | 3 | 2.42 | 44.5 |
| 37 | Isopropyl alcohol | 0.065 | 0.025 | 98 | 58 | 38 | 4 | 2.44 | 45 |
| 38 | Isopropyl alcohol | 0.196 | 0.021 | 93 | 59 | 38 | 3 | 2.49 | 46 |
| 39 | Isopropyl alcohol | 0.495 | 0.023 | 85 | 63 | 34 | 3 | 2.51 | 47 |
| 40 | n-Butyl alcohol | 0.033 | 0.020 | 99 | 56 | 41 | 3 | 2.43 | 45 |
| 41 | n-Butyl alcohol | 0.065 | —** | 97 | 57 | 40 | 3 | 2.43 | 45 |

Table 12-continued

| Run No. | Alcohol Name | Amount* (mole) | Water content (mole) | Yield (%) | Microstructure (%) Trans | Vinyl | Cis | [η] dl/g | ML$_{1+4}$(100° C) |
|---|---|---|---|---|---|---|---|---|---|
| 42 | n-Butyl alcohol | 0.196 | —** | 95 | 59 | 38 | 3 | 2.46 | 45.5 |
| 43 | n-Butyl alcohol | 0.495 | 0.023 | 89 | 62 | 35 | 3 | 2.49 | 47 |
| 44 | Cyclohexyl alcohol | 0.033 | 0.021 | 96 | 57 | 40 | 3 | 2.45 | 46 |
| 45 | cyclohexyl alcohol | 0.065 | 0.023 | 95 | 58 | 39 | 3 | 2.48 | 47 |
| 46 | Cyclohexyl alcohol | 0.196 | 0.024 | 90 | 58 | 38 | 4 | 2.49 | 46.5 |
| 47 | Cyclohexyl alcohol | 0.495 | 0.023 | 77 | 62 | 34 | 4 | 2.52 | 48 |

Note:- *The amount of the alcohol added was expressed in moles per mole of allyl sodium in the catalyst (the same applies hereinafter).
**Since the dehydration treatment of the reaction system was effected thoroughly, water was not detected (less than 0.01 mole, if any).

It is seen from Table 12 that the trans-1,4 content of the polymer increases with an increase of the amount of the alcohol added.

EXAMPLE 9

The procedure of Example 8 was repeated, except that 20 millimoles of diethylene glycol diethyl ether was substituted for the vinyl chloride. The results obtained were as shown in Table 13.

Table 13

| Run No. | Alcohol Name | Amount (mole) | Yield (%) | Microstructure (%) Trans | Vinyl | Cis | [η] (dl/g) | ML$_{1+4}$(100° C) |
|---|---|---|---|---|---|---|---|---|
| 8 (control) | — | — | 99 | 40 | 57 | 3 | 2.00 | 32 |
| 48 | Methyl alcohol | 0.065 | 92 | 47 | 50 | 3 | 2.09 | 34 |
| 49 | Isopropyl alcohol | 0.065 | 97 | 46 | 51 | 3 | 2.05 | 32 |
| 50 | Isopropyl alcohol | 0.196 | 94 | 52 | 44 | 4 | 2.11 | 36 |
| 51 | n-Butyl alcohol | 0.065 | 98 | 46 | 50 | 4 | 2.06 | 33 |
| 52 | n-Butyl alcohol | 0.196 | 93 | 51 | 46 | 3 | 2.09 | 33 |
| 53 | Cyclohexyl alcohol | 0.065 | 96 | 48 | 49 | 3 | 2.04 | 32 |

Note: The water content in the reaction system was in the range of 0.018 to 0.025 mole per mole of allyl sodium.

EXAMPLE 10

The procedure of Example 8 was repeated, except that 4 millimoles of vinyl chloride, 7 millimoles of o-dichlorobenzene, and 8 millimoles of 1,4-dihydronaphthalene were substituted for the 7 millimoles of vinyl chloride. The results obtained were as shown in Table 14.

Table 14

| Run No. | Alcohol Name | Amount (mole) | Yield (%) | Microstructure (%) Trans | Vinyl | Cis | [η] (dl/g) | ML$_{1+4}$(100° C) |
|---|---|---|---|---|---|---|---|---|
| 12 (control) | — | — | 99 | 51 | 46 | 3 | 2.22 | 40 |
| 54 | Methyl alcohol | 0.065 | 93 | 57 | 40 | 3 | 2.33 | 44 |
| 55 | Isopropyl alcohol | 0.065 | 99 | 55 | 42 | 3 | 2.28 | 43 |
| 56 | Isopropyl alcohol | 0.196 | 96 | 59 | 38 | 3 | 2.40 | 46 |
| 57 | n-Butyl alcohol | 0.065 | 98 | 56 | 41 | 3 | 2.27 | 43 |
| 58 | n-Butyl alcohol | 0.196 | 95 | 58 | 39 | 3 | 2.38 | 46 |
| 59 | Cyclohexyl alcohol | 0.065 | 98 | 57 | 40 | 3 | 2.26 | 42 |

Note: The water content in the reaction system was in the range of 0.018 to 0.025 mole per mole of allyl sodium.

EXAMPLE 11

The procedure of Example 8 was repeated, except that 10 millimoles of 1,4-dihydronaphthalene and 15 millimoles of trimethylamine were substituted for the 7 millimoles of vinyl chloride. The results obtained were as shown in Table 15.

Table 15

| Run No. | Alcohol Name | Amount (mole) | Yield (%) | Microstructure (%) Trans | Vinyl | Cis | [η] (dl/g) | ML$_{1+4}$(100° C) |
|---|---|---|---|---|---|---|---|---|
| 20 (control) | — | — | 92 | 49 | 47 | 4 | 2.36 | 45.5 |
| 60 | Methyl alcohol | 0.065 | 87 | 54 | 43 | 3 | 2.42 | 47 |
| 61 | Isopropyl alcohol | 0.065 | 90 | 53 | 44 | 3 | 2.38 | 45 |
| 62 | Isopropyl alcohol | 0.196 | 86 | 58 | 38 | 4 | 2.50 | 48 |
| 63 | n-Butyl alcohol | 0.065 | 91 | 54 | 43 | 3 | 2.40 | 46 |
| 64 | n-Butyl alcohol | 0.196 | 84 | 57 | 40 | 3 | 2.51 | 47.5 |
| 65 | Cyclohexyl alcohol | 0.065 | 89 | 55 | 42 | 3 | 2.44 | 47 |

Note: The water content in the reaction system was in the range of 0.018 to 0.027 mole per mole of allyl sodium.

The tendency of the effect of alcohols was similar to that in Example 8.

EXAMPLE 12

The procedure of Example 10 was repeated, except that 250 g of butadiene was used as the monomer in place of the 25 g of styrene and 225 g of butadiene. The results obtained were as shown in Table 16.

Table 16

| Run No. | Alcohol Name | Amount (mole) | Yield (%) | Microstructure (%) Trans | Vinyl | Cis | [η] (dl/g) | $ML_{1+4}(100°\ C)$ |
|---|---|---|---|---|---|---|---|---|
| 16 (control) | — | — | 99 | 53 | 44 | 3 | 2.28 | 43 |
| 66 | Methyl alcohol | 0.065 | 94 | 58 | 39 | 3 | 2.40 | 47 |
| 67 | Isopropyl alcohol | 0.065 | 98 | 58 | 38 | 4 | 2.35 | 46 |
| 68 | Isopropyl alcohol | 0.196 | 93 | 63 | 34 | 3 | 2.46 | 49 |
| 69 | n-Butyl alcohol | 0.065 | 99 | 57 | 40 | 3 | 2.33 | 46 |
| 70 | n-Butyl alcohol | 0.195 | 91 | 61 | 35 | 4 | 2.42 | 48 |
| 71 | Cyclohexyl alcohol | 0.065 | 95 | 56 | 41 | 3 | 2.36 | 46 |

Note: The water content in the reaction system was in the range of 0.018 to 0.025 mole per mole of allyl sodium.

The tendency of the effect of alcohols was similar to that in Example 8.

EXAMPLE 13

The polymers obtained in Comparative Example 1 and Examples 8 to 12 were compounded according to the recipe given in Table 17 on a 6-inch open roll and the green strength of each compound was measured. After the compounds had been press-cured at 145° C for 40 minutes, the physical properties of the resulting vulcanizates were measured. The results obtained were as shown in Table 18.

| Ingredient | Parts by weight |
|---|---|
| Polymer | 100 |
| HAF carbon black | 50 |
| Aromatic process oil | 5 |
| Zinc oxide | 5 |
| Stearic acid | 3 |
| Accelerator CZ* | 1.5 |
| Sulfur | 2 |

Note:-*CZ:n-cyclohexyl-benzothiazyl-sulfenamide

Table 18

| | Run No. | 1 | 3 | 34 | 38 | 42 | 46 | 12 | 54 | 56 | 58 | 59 |
|---|---|---|---|---|---|---|---|---|---|---|---|---|
| Unvulcanized rubber | Mooney viscosity, $ML_{1+4}(100°\ C)$ | 50 | 44 | 46.5 | 46 | 45.5 | 46.5 | 40 | 44 | 46 | 46 | 42 |
| | Softening temperature*, °C | 82 | 53 | 55 | 54 | 54 | 54 | 55 | 57 | 56 | 57 | 57 |
| Compounded rubber | Green strength, kg/cm$^2$ | 29 | 7 | 21 | 18 | 20 | 18 | 16 | 30 | 34 | 32 | 28 |
| | 300 % Modulus, kg/cm$^2$ | 65 | 60 | 67 | 62 | 63 | 62 | 85 | 95 | 97 | 95 | 93 |
| Vulcanizate | Tensile strength, kg/cm$^2$ | 224 | 200 | 219 | 208 | 210 | 211 | 211 | 230 | 242 | 236 | 226 |
| | Elongation, % | 560 | 620 | 530 | 570 | 580 | 570 | 530 | 550 | 570 | 560 | 560 |
| | Hardness (JIS A) | 53 | 55 | 57 | 56 | 56 | 56 | 58 | 59 | 60 | 60 | 59 |
| | Remarks | Control | | | Present invention | | | Control | Present invention | | | |

Note:- *Softening temperature is the temperature of rubber at which 100 g of unvulcanized rubber is uniformly banded on the roll (roll clearance: 1.0 mm; guide distance: 100 mm) and cutting with a knife becomes possible.

It is seen from the results shown in Table 18 that with an increase of the amount of alcohols added to the polymerization system, the green strength of the polymer and the physical properties of the vulcanizate are increased, while the good processability is retained. Therefore, the rubber according to this invention is found excellent in processability, green strength, and even the physical properties of vulcanizate.

What is claimed is:

1. A process for producing a conjugated diolefinic polymer by polymerizing at least one conjugated diolefin or copolymerizing at least one conjugated diolefin with at least one vinyl aromatic hydrocarbon in a hydrocarbon solvent in the presence of an alfin catalyst and at least one molecular weight regulator selected from the group consisting of (A) unsaturated halohydrocarbons represented by the general formula, RCX = CYZ, wherein R represents hydrogen, an alkyl group having 1 to 7 carbon atoms, a vinyl group, a phenyl group, a substituted phenyl group, or a halogen atom and X, Y, and Z represent independently hydrogen or a halogen atom, at least one of said R, X, Y, and Z being a halogen atom, (B) halogenated aromatic compounds, (C) ethers, polyethers, and acetals, and (D) tertiary amines, and, if necessary, a dihydro aromatic compound, characterized in that said polymerization or copolymerization is effected in the presence of 0.03 to 0.9 mole of water, an alcohol of the formula, R-OH, where R is a saturated or unsaturated aliphatic or alicyclic group having 1 to 20 carbon atoms, or a mixture of water and the alcohol, per mole of organosodium contained in said alfin catalyst.

2. The process according to claim 1, wherein the polymerization is carried out in the presence of 0.03 to 0.9 mole of water per mole of organosodium in the catalyst.

3. The process according to claim 1, wherein the polymerization is carried out in the presence of 0.03 to 0.9 mole of the alcohol per mole of organosodium in the catalyst.

4. The process according to claim 1, wherein the polymerization is carried out in the presence of 0.03 to 0.9 mole of the mixture of water and the alcohol per mole of organosodium in the catalyst.

5. The process according to claim 1, wherein the amount of water, the alcohol or the mixture is 0.05 to 0.6 mole per mole of organosodium in the catalyst.

6. The process according to claim 1, wherein the alcohol is methanol, ethanol, isopropanol, n-butanol, n-dodecyl alcohol, cyclohexyl alcohol, or cyclooctyl alcohol.

7. The process according to claim 1, wherein the alcohol is methanol, ethanol, isopropanol, or n-butanol.

8. The process according to claim 1, wherein the alcohol is isopropanol.

9. The process according to claim 1, wherein the alochol is n-butanol.

10. The process according to claim 1, wherein the conjugated diene is selected from the group consisting of 1,3-butadiene, isoprene, piperylene and 2,3-dimethyl-1,3-butadiene and the vinyl aromatic hydrocarbon is selected from the group consisting of styrene, divinylbenzene, α-methylstyrene, β-methylstyrene, 3-vinyltoluene, 1-vinylnaphthalene, 2-vinylnaphthalene, p-methoxystyrene and p-bromostyrene.

11. The process according to claim 1, wherein the molecular weight regulator is at least one compound selected from the group consisting of vinyl chloride, vinyl bromide, vinyl iodide, vinyl fluoride, vinylidene chloride, vinylidene fluoride, isopropenyl chloride, trichloroethylene, 2-chloro-1-butene, α-chlorostyrene and chloroprene, and the amount of said molecular weight regulator is 0.01 to 1,000 millimoles per 100 g of the monomer.

12. The process according to claim 1, wherein the molecular weight regulator is at least one compound selected from the group consisting of chlorobenzene, bromobenzene, o-dichlorobenzene, m-dichlorobenzene, p-dichlorobenzene, o-chlorotoluene and α-chloronaphthalene, and the amount of said molecular weight regulator is 0.05 to 2,000 millimoles per 100 g of the monomer.

13. The process according to claim 1, wherein the molecular weight regulator is at least one compound selected from the group consisting of diethyl ether, diisopropyl ether, ethyl butyl ether, methyl benzyl ether, ethylene glycol diethyl ether, diethylene glycol dimethyl ether, 1,1-dimethoxyethane and benzaldehyde dimethylacetal, and the amount of said molecular weight regualtor is 0.01 to 10,000 millimoles per 100 g of the monomer.

14. The process according to claim 1, wherein the molecular weight regualtor is at least one compound selected from the group consisting of diethylmethylamine, triethylamine, trimethylamine, triisopropylamine, dimethylpropyl amine and dimethylaniline, and the amount of said molecular weight regulator is 0.02 to 10,000 millimoles per 100 g of the monomer.

15. The process according to claim 1, wherein the molecular weight regulator is a combination of (A) and (B) with a dihydro aromatic compound.

16. The process according to claim 15, wherein the dihydro aromatic compound is 1,4-dihydrobenzene, 1,2-dihydrobenzene, 1,4-dihydronaphthalene, 1,2-dihydronaphthalene, dihydrotoluene, dihydroxylene or dihydroanthracene.

17. The process according to claim 1, wherein the amount of catalyst is 0.1 to 100 millimoles in terms of organosodium per 100 g of the monomer.

18. The process according to claim 1, wherein the polymerization is carried out at a temperature of −50° to 150° C under a pressure of 1 to 5 atmospheres.

19. The process according to claim 1, wherein the polymerization is carried out under an inactive gas atmosphere.

20. The process according to claim 19, wherein the inactive gas is argon, helium or nitrogen.

21. The process according to claim 1, wherein the hydrocarbon solvent is n-pentane, isopentane, n-hexane, n-heptane, n-octane, isooctane, cyclohexane, cyclooctane, benzene, toluene, xylene or tetrahydronaphthalene.

* * * * *